US011698101B2

(12) United States Patent
Paerewyck et al.

(10) Patent No.: US 11,698,101 B2
(45) Date of Patent: Jul. 11, 2023

(54) BALL SOCKET ASSEMBLY AND METHOD OF MAKING

(71) Applicant: Federal-Mogul Motorparts LLC, Southfield, MI (US)

(72) Inventors: Sidney Paerewyck, Aalst (BE); Johannes Kankare, Woluwe-St-Lambert (BE); Thomas J. Byrnes, Jr., Saint Charles, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 402 days.

(21) Appl. No.: 16/171,493

(22) Filed: Oct. 26, 2018

(65) Prior Publication Data

US 2019/0128319 A1 May 2, 2019

Related U.S. Application Data

(60) Provisional application No. 62/578,103, filed on Oct. 27, 2017.

(51) Int. Cl.
*F16C 11/06* (2006.01)

(52) U.S. Cl.
CPC ...... *F16C 11/0638* (2013.01); *F16C 11/0685* (2013.01); *Y10T 403/32737* (2015.01)

(58) Field of Classification Search
CPC ..... Y10T 403/32721; Y10T 403/32737; F16C 11/0628; F16C 11/0633; F16C 11/06;
(Continued)

(56) References Cited

U.S. PATENT DOCUMENTS 3,530,495 A * 9/1970 Kindel ............... F16C 11/0638
403/140
3,787,127 A * 1/1974 Cutler ............... F16C 11/0638
403/140
(Continued)

FOREIGN PATENT DOCUMENTS

CN 102037250 A 4/2011
DE 102004048753 A1 * 4/2006 ............ B60G 7/005
(Continued)

OTHER PUBLICATIONS

"AISI 5140 Alloy Steel" AZO Materials, Sep. 17, 2012, [online], [retrieved on Sep. 30, 2020] Retreived from the Internet 2 pages <URL:https://www.azom.com/article.aspx?ArticleID=6719 (Year: 2012).*
(Continued)

*Primary Examiner* — Josh Skroupa
*Assistant Examiner* — Kevin J Baynes
(74) *Attorney, Agent, or Firm* — Robert L. Stearns; Dickinson Wright, PLLC

(57) ABSTRACT

The ball socket assembly includes a housing with an inner bore, and a bearing is received in the inner bore. The bearing is made as a monolithic piece of a plastic material and has a curved bearing surface which surrounds a ball cavity. The ball socket assembly also includes a ball stud with a ball portion and a shank portion. The ball portion is received in the ball cavity of the bearing and has an equator. The curved bearing surface of the bearing is in slidable contact with the ball portion on opposite axial sides of the equator. The plastic material of the bearing comprises 8-12 mass percent polytetrafluoroethylene, 2-6 mass percent carbon fibers, and the remainder acetal.

17 Claims, 5 Drawing Sheets

(58) Field of Classification Search
CPC .............. F16C 11/0604; F16C 11/0614; F16C 11/0685; F16C 11/0695; F16C 11/08; F16C 11/086; F16C 11/0865; F16C 2208/02; F16C 2208/30; F16C 2208/66; F16C 2226/74; F16C 23/04; F16C 23/045; F16C 2326/24; F16C 43/04; F16C 11/0638
USPC .......................... 403/133; 384/203, 206–212
See application file for complete search history.

(56) References Cited

U.S. PATENT DOCUMENTS

| | | | | |
|---|---|---|---|---|
| 4,318,627 A | * | 3/1982 | Morin | F16C 11/0638 403/140 |
| 4,591,276 A | * | 5/1986 | Schneider | F16C 11/0638 384/206 |
| 4,714,368 A | * | 12/1987 | Sawada | F16C 11/069 403/140 |
| 4,722,631 A | * | 2/1988 | Tagami | F16C 11/0685 403/140 |
| 4,755,075 A | * | 7/1988 | Leem | B43K 21/085 401/86 |
| 4,790,682 A | * | 12/1988 | Henkel | F16C 11/0638 403/135 |
| 4,993,863 A | * | 2/1991 | Inoue | F16C 11/0657 403/71 |
| 5,092,703 A | * | 3/1992 | Kobayashi | F16C 7/026 74/579 R |
| 5,630,672 A | * | 5/1997 | McHale | F16C 11/0642 403/135 |
| 5,672,024 A | * | 9/1997 | Maughan | B62D 7/16 403/135 |
| 5,697,142 A | * | 12/1997 | Sugiura | F16C 11/0633 29/527.4 |
| 5,704,727 A | * | 1/1998 | Atkins | F16C 11/069 403/135 |
| 6,164,829 A | * | 12/2000 | Wenzel | F16C 11/0638 403/135 |
| 6,254,114 B1 | * | 7/2001 | Pulling | B60G 7/005 280/93.511 |
| 6,302,615 B1 | * | 10/2001 | Kleiner | F16C 11/0642 403/135 |
| 6,398,446 B1 | * | 6/2002 | Pazdirek | B60G 7/001 403/135 |
| 6,902,344 B2 | * | 6/2005 | Raak | F16C 11/0638 403/135 |
| 7,452,155 B2 | * | 11/2008 | Brunneke | F16C 17/246 403/135 |
| 8,864,155 B2 | * | 10/2014 | Kuroda | B60G 7/005 280/124.107 |
| 2005/0207830 A1 | * | 9/2005 | Brunneke | F16C 11/0647 403/122 |
| 2009/0288297 A1 | * | 11/2009 | Schmidt | F16C 11/0633 29/898.052 |
| 2016/0298691 A1 | * | 10/2016 | Dowie | F16C 7/06 |

FOREIGN PATENT DOCUMENTS

GB 2112448 A 7/1983
JP 2009250251 A 10/2009

OTHER PUBLICATIONS

Marsh G: "Thermoplastics drive into the future", Reinforced Plastics, Elsevier Advanced Technology, New York, NY, US, vol. 42, No. 9, Oct. 1, 1998 (Oct. 1, 1998), pp. 46-47, 49, XP004139725, ISSN: 0034-3617.

* cited by examiner

BALL SOCKET ASSEMBLY AND METHOD OF MAKING

CROSS REFERENCE TO RELATED APPLICATIONS

This U.S. patent application claims the benefit of U.S. Provisional Patent Application Ser. No. 62/578,103 filed Oct. 27, 2017 entitled "Ball Socket Assembly and Method of Making," the entire disclosure of the application being considered part of the disclosure of this application and hereby incorporated by reference.

BACKGROUND OF THE INVENTION

1. Field of the Invention

The present invention is related generally to ball socket assemblies and more particularly to a ball socket assembly with a bearing that is made of a monolithic piece of a plastic material.

2. Related Art

Vehicle suspension and steering systems typically include a number of ball joints which fixedly attach various components while allowing relative rotation and articulation between those components. A ball joint generally has a housing, a ball stud, and one or more bearings. In ball joints with a single bearing, where the bearing is made as a monolithic piece, it must be constructed in such a way that the ball stud can be inserted into the bearing without fracturing, or otherwise breaking the bearing. One approach to solving this problem is to make the bearing out of a material that has a high elasticity so that the bearing can deform elastically when the ball stud is inserted into a ball cavity of the bearing.

SUMMARY OF THE INVENTION AND ADVANTAGES

One aspect of the present invention is related to a ball socket assembly which includes a housing with an inner bore, and a bearing is received in the inner bore. The bearing is made as a monolithic piece of a plastic material and has a curved bearing surface which surrounds a ball cavity. The ball socket assembly also includes a ball stud with a ball portion and a shank portion. The ball portion is received in the ball cavity of the bearing and has an equator. The curved bearing surface of the bearing is in slidable contact with the ball portion on opposite axial sides of the equator. The plastic material of the bearing comprises 8-12 mass percent polytetrafluoroethylene, 2-6 mass percent carbon fibers, and the remainder acetal.

The plastic material of the single piece bearing provides the bearing with an optimal combination of elasticity, thereby allowing the bearing to flex while inserting the ball portion of the ball stud into the ball cavity, and strength to resist failure when subjected to operational loads.

According to another aspect of the present invention, the plastic material of the bearing consists essentially of 8-12 mass percent polytetrafluoroethylene, 2-6 mass percent carbon fibers, and the remainder acetal.

According to yet another aspect of the present invention, the bearing includes a plurality of fingers which are spaced circumferentially from one another by slots and wherein the fingers can deflect radially to allow the ball portion of the ball stud to be inserted into the ball cavity.

According to still another aspect of the present invention, the fingers extend across the equator of the ball portion of the ball stud.

According to a further aspect of the present invention, at least a portion of the ball stud is heat treated.

According to yet a further aspect of the present invention, the heat treated portion of the ball stud is in slidable contact with the curved bearing surface of the bearing.

According to still a further aspect of the present invention, the ball stud is made out of 5140 steel.

Another aspect of the present invention is related to a method of making a ball socket assembly. The method includes the step of preparing a bearing, which is made as a monolithic piece of a plastic material that comprises 8-12 mass percent polytetrafluoroethylene, 2-6 mass percent carbon fibers, and the remainder acetal. The bearing includes a plurality of fingers which are spaced circumferentially from one another and at least partially surround the ball cavity. The method continues with the step of urging a ball portion of the ball stud towards the ball cavity. The method proceeds with the step of deflecting the fingers in a radially outward direction to allow the ball portion of the ball stud to pass the fingers and be received in the ball cavity. The method continues with the step of inserting the bearing, with the ball portion contained in the ball cavity, into the inner bore of the housing.

According to another aspect of the present invention, the plastic material of the bearing consists essentially of 8-12 mass percent polytetrafluoroethylene, 2-6 mass percent carbon fibers, and the remainder acetal.

According to yet another aspect of the present invention, after the ball portion of the ball stud is received in the ball cavity of the bearings, the fingers extend across an equator of the ball stud.

According to still another aspect of the present invention, the method further includes the step of heat treating a portion of the ball stud prior to inserting the ball portion of the ball stud into the ball cavity of the bearing.

According to a further aspect of the present invention, the ball stud is made out of 5140 steel.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
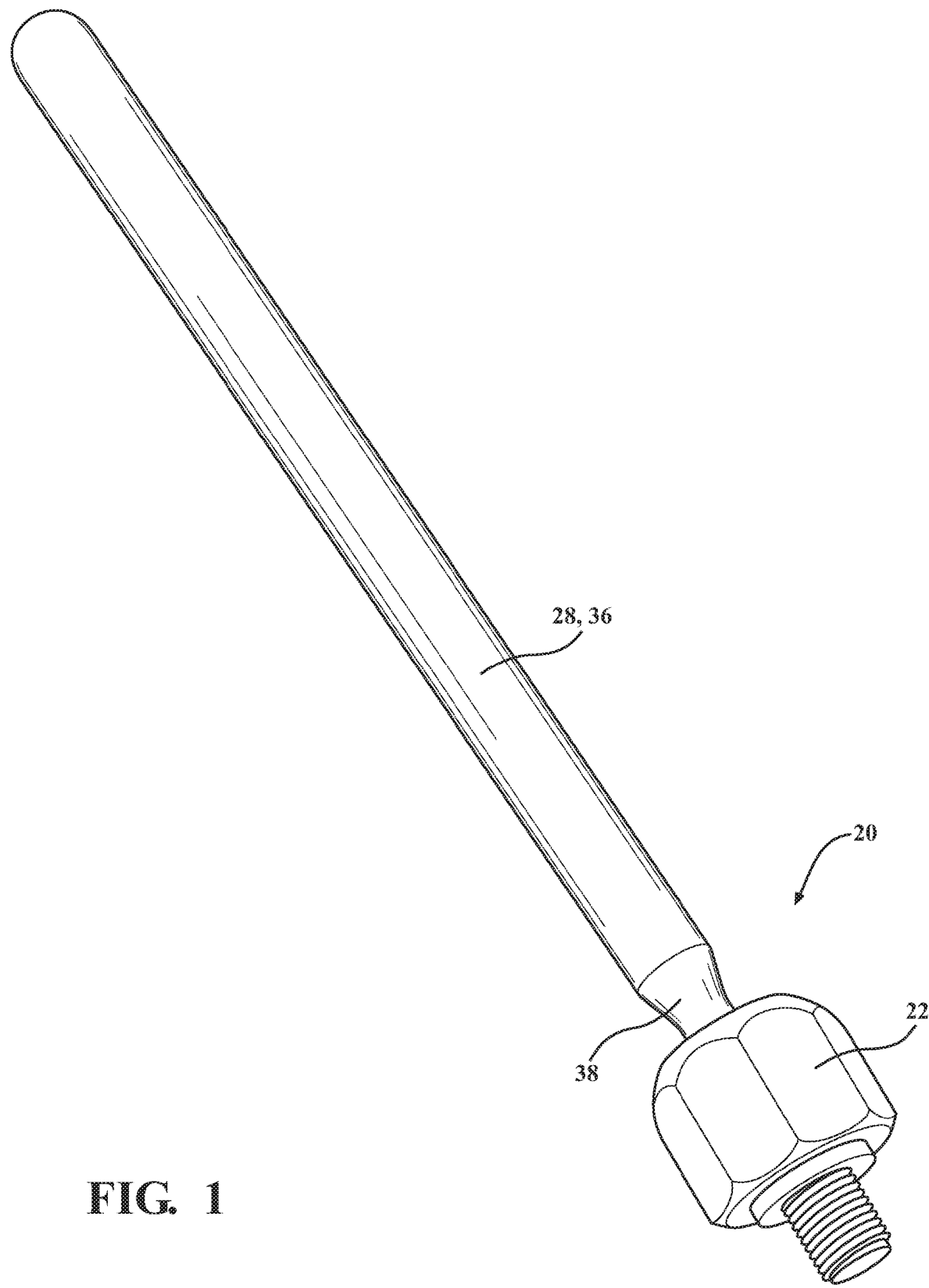
FIG. 1 is a perspective elevation view of an exemplary embodiment of a socket assembly constructed according to one aspect of the present invention.
Figure 2:
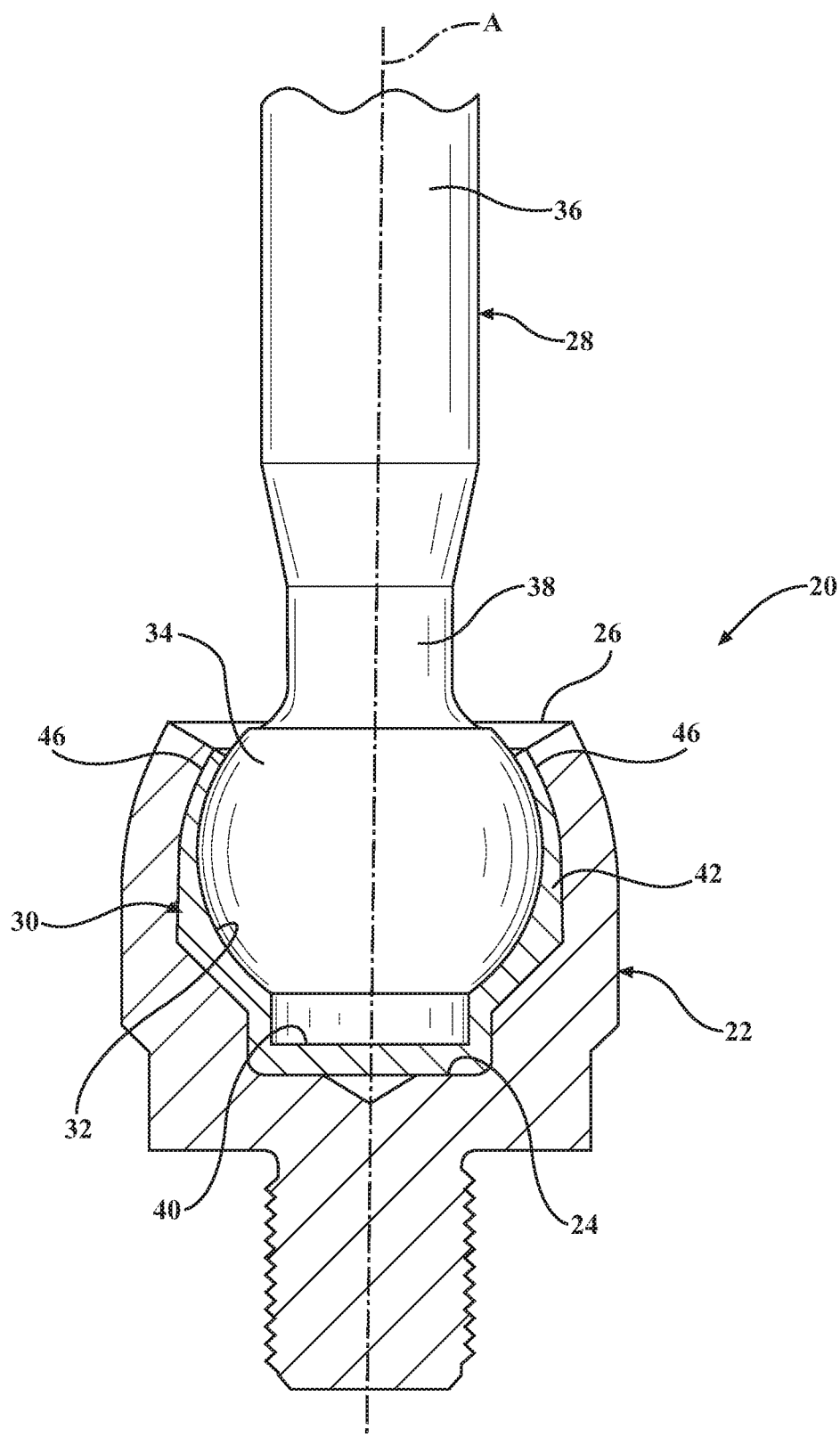
FIG. 2 is a partially cross-sectional view of the socket assembly of FIG. 1.
Figure 3:
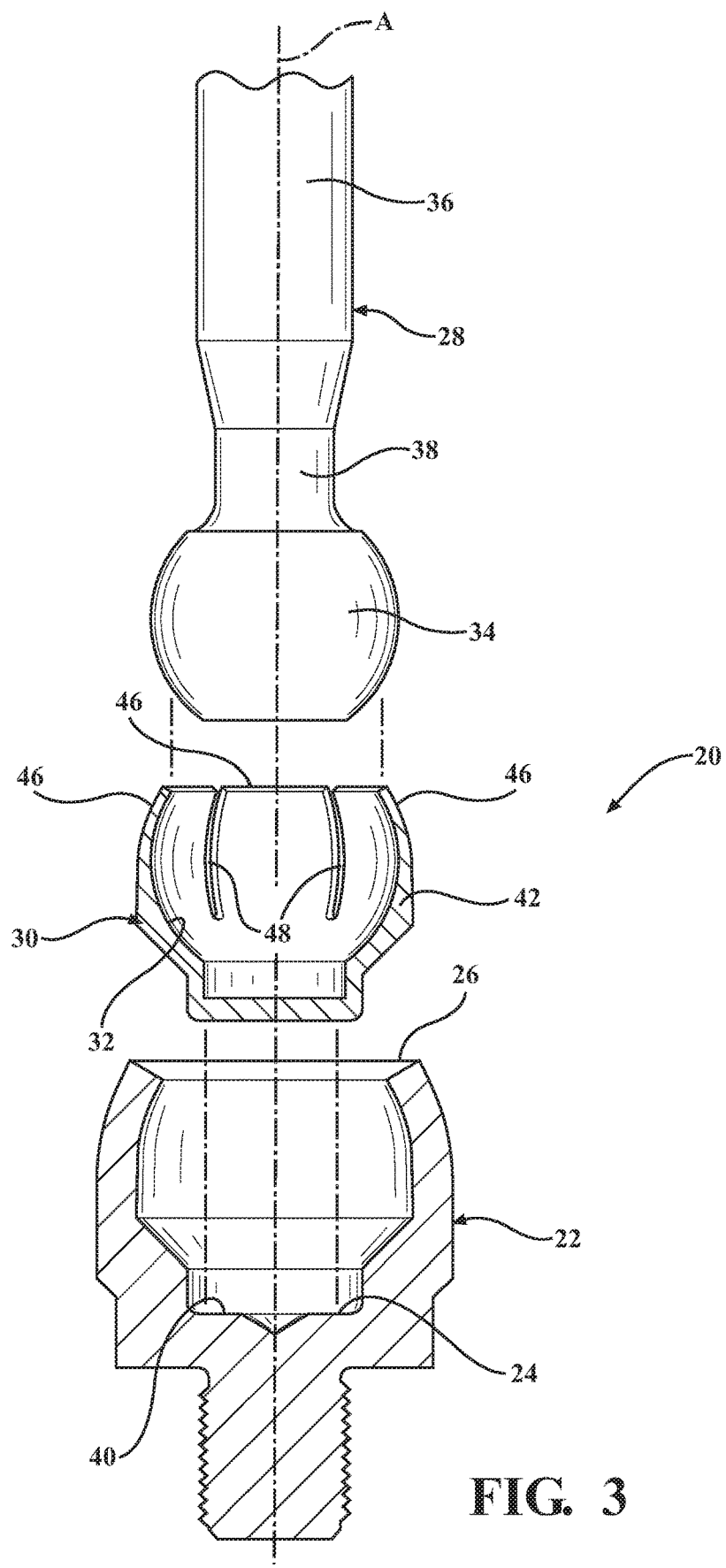
FIG. 3 is an exploded and partially cross-sectional view of the socket assembly of FIG. 1.
Figure 4:
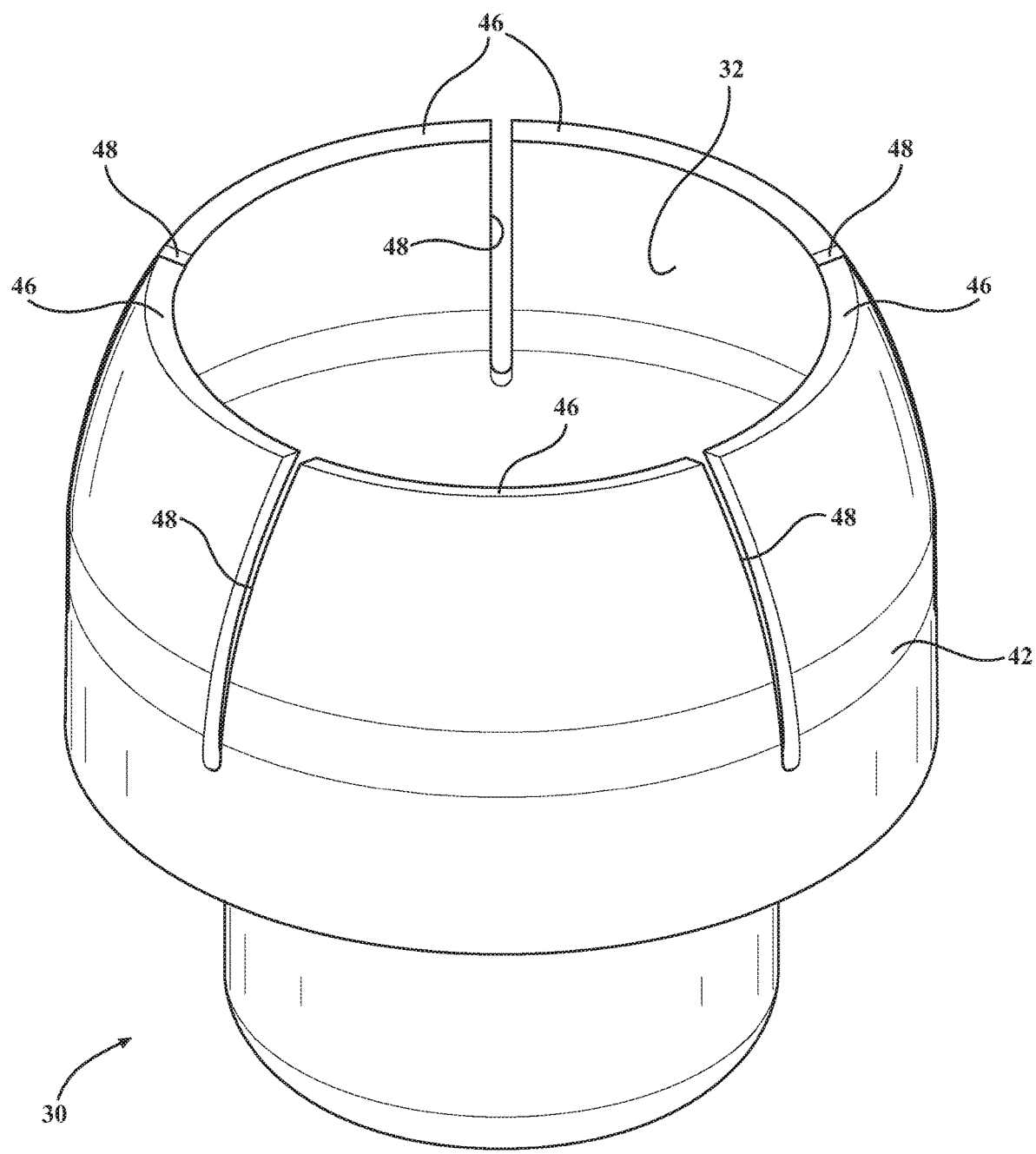
FIG. 4 is a perspective elevation view of a bearing of the socket assembly of FIG. 1.

Referring to FIGS. 1-3, wherein like numerals indicate corresponding parts throughout the several views, an exemplary embodiment of a ball socket assembly 20 for a vehicle steering system is generally shown. In the exemplary embodiment, the ball socket assembly 20 is an inner tie rod end. However, it should be appreciated that the ball socket assembly 20 could find other automotive or non-automotive applications. For example, the ball socket assembly 20 could be configured to connect a control arm with a knuckle or could be an outer tie rod end in a vehicle suspension system.

The ball socket assembly 20 includes a housing 22 with an inner bore which extends along a central axis A from a closed first end 24 to an open second end 26. The housing 22 is preferably made as a monolithic piece of metal, such as steel or an alloy steel and may be shaped through any suitable process or combination of processes including, for example, casting, forging, and/or machining.

The ball socket assembly 20 also includes a ball stud 28 and a bearing 30 which provides a low-friction interface between the housing 22 and the ball stud 28 to allow these components to freely rotate and articulate relative to one another during operation of the steering system. The bearing 30 is located in the inner bore of the housing and has a semi-spherically curved bearing surface 32 which surrounds a ball cavity. The ball stud 28 has a ball portion 34 that is disposed in the ball cavity and has an outer surface which is in slidable contact with the curved bearing surface 32 of the bearing 30. The outer surface of the ball portion 34 and the curved bearing surface 32 have similar radiuses of curvature, thereby allowing the ball stud 28 to freely articulate and rotate relative to the bearing 30 and housing 22.

The ball stud 28 also has a shank portion 36 which extends out of the inner bore through the open second end 26 of the housing 22. The shank portion 36 has a neck region 38 with a reduced diameter adjacent the ball portion 34. The shank portion 36 tapers in a direction away from the ball portion 34 from the neck portion 38 to a greater diameter. The ball stud 28 is preferably made as a monolithic piece of metal, such as steel or an alloy steel and is most preferably made of SAE-AISI 5140 steel.

The bearing 32 is generally cup shaped with a bottom and a side wall 42. The curved bearing surface 32 is on the side wall 42, and the bottom has an axially centrally located recessed area 40 which is not a part of the curved bearing surface 32. The side wall 42 also presents a plurality of fingers 46 which are spaced circumferentially from one another by a plurality of slots 48 that extend from the open top towards the bottom. In the exemplary embodiment, the bearing 30 has five fingers 46 and five slots 48. However it should be appreciated that the bearing 30 could have any suitable number of fingers 46 and slots 48.

Figure 5C:
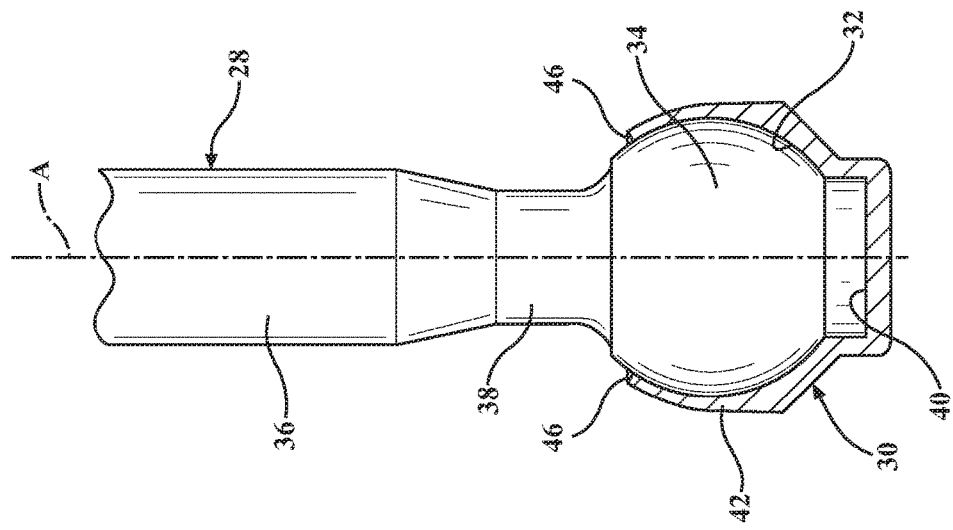
FIG. 5C shows the ball stud as being assembled with the bearing.
Figure 5B:
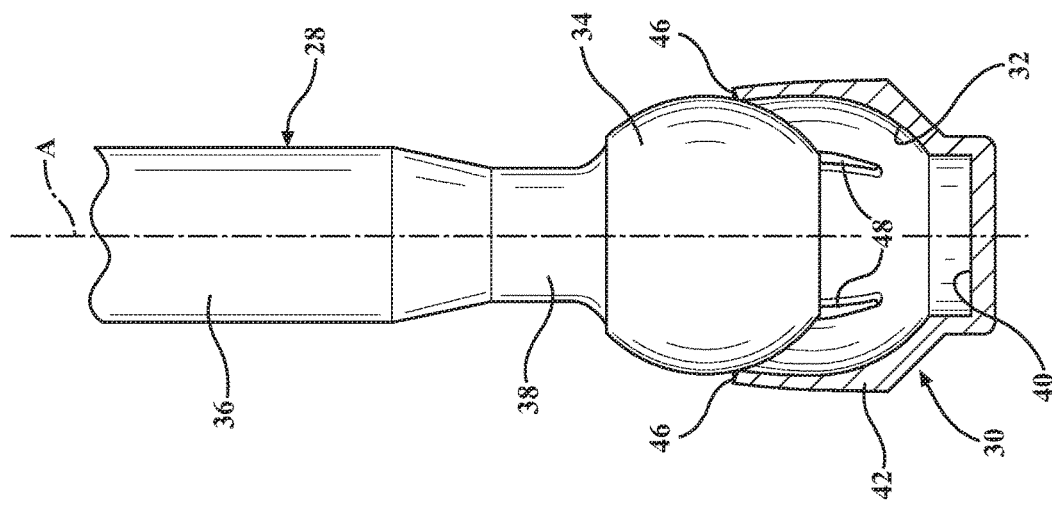
FIG. 5B shows the ball stud during assembly with the bearing.
Figure 5A:
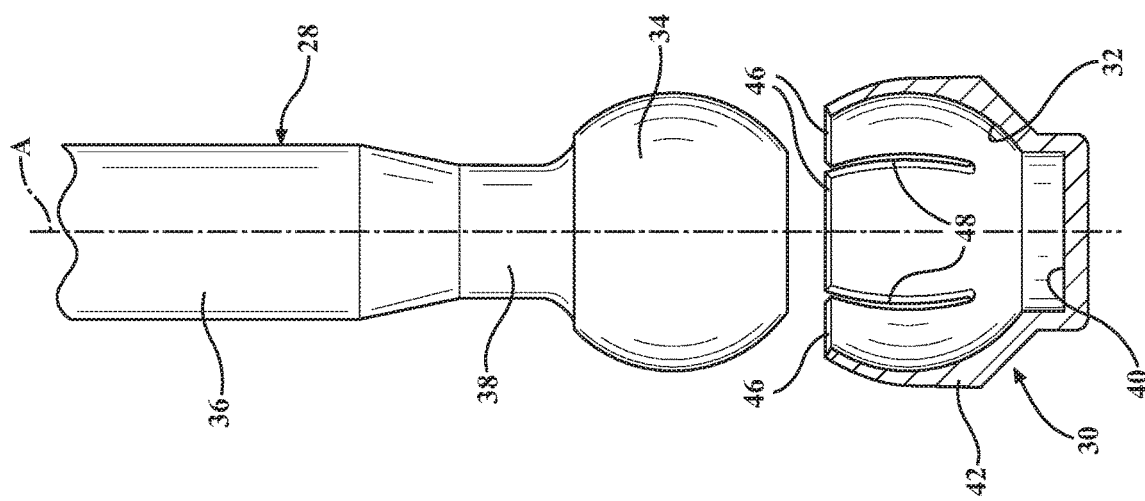
FIG. 5A shows the bearing of FIG. 4 in cross-section and a ball stud in a pre-assembled condition.

FIGS. 5A-C show the process of inserting the ball portion 34 of the ball stud 28 into the ball cavity of the bearing 30. In FIG. 5A, the bearing 30 is shown with the fingers 46 in a resting (unstressed) condition such that an open top of the bearing 30 has a smaller inner diameter than a diameter of an equator of the ball portion 34 of the ball stud 28. Referring now to FIG. 5B, the fingers 46 are elastically deflectable such that, when the ball portion 34 is urged against the open top of the bearing 30, the fingers 46 deflect radially outwardly to expand the inner diameter of the open top and allow an equator of the ball portion 34 to pass into the ball cavity. Referring now to FIG. 5C, once the equator clears the ends of the fingers 46, the fingers 46 spring inwardly to trap the ball portion 34 in the ball cavity. With the ball portion 34 in the ball cavity, the bearing 30 is once again in the resting condition. As shown, the curved bearing surface 32 has a radius of curvature which matches the radius of curvature of the ball portion 34 of the ball stud 28.

As also shown in FIGS. 5A-C, the slots 48 of the bearing 30 extend more than halfway from the open top to the bottom with the recessed area 40. Thus, when the ball portion 34 is received in the ball cavity, the slots 48 in the bearing 30 extend past the equator of the ball portion 34. Also, in this installed condition, the curved bearing surface 32 is in slidable contact with both hemispheres of the ball portion 34, i.e., both above and below the equator.

Once the ball portion 34 is trapped inside of the ball cavity of the bearing 30, the bearing 30 and ball portion 34 can then be inserted as a unit into the inner bore of the housing 22. In the exemplary embodiment, the open first end 24 of the housing 22 is then swaged inwardly to trap the bearing 30 and ball portion 34 in the open bore. The recessed area 40 of the bearing 30 functions as a lubricant reservoir to maintain a lubricant (such as grease) in the housing 22 to lubricate the surface-to-surface contact between the ball portion 34 of the ball stud 28 and the curved bearing surface 32 of the bearing 30.

In the exemplary embodiment, the plastic material of the bearing 30 comprises 8-12 mass percent polytetrafluoroethylene, 2-6 mass percent carbon fibers, and the remainder polyoxymethylene (POM, also known as acetal, polyacetal, and polyformaldehyde). This composition has been found to provide the bearing 30 with new and unexpected results. Specifically, this composition provides sufficient lubrication of the surface-to-surface contact between the ball portion 34 of the ball stud 28 and the curved bearing surface 32 and sufficient strength to transfer impact forces between the ball stud 28 and the housing 22 without compromising the flexibility of the fingers 46. That is, the fingers 46 are resistant to fracture during the process of inserting the ball portion 34 of the ball stud 28 into the ball cavity of the bearing 30.

The ball stud 28 is preferably heat treated at least in the neck region 38 to reinforce the ball stud 28 against fracture. The combination of the unique plastic material of the bearing 30 and the heat treated SAE-AISI 5140 steel ball 28 stud has been found to provide the ball socket assembly 20 with both exceptional performance and durability as compared to other known ball socket assemblies with ball studs that are made out of SAE-AISI 5140 steel.

Another aspect of the present invention is related to a method of making a ball socket assembly 20, such as the ball socket assembly 20 described above and shown in FIGS. 1-5. The method includes the step of preparing the bearing 30. The method proceeds with the step of urging a ball portion 34 of a ball stud 28 towards the ball cavity. The method continues with the step of deflecting the fingers 46 in a radially outward direction to allow the ball portion 34 of the ball stud 28 to pass the ends of the fingers 46 and be received in the ball cavity. The method proceeds with the step of inserting the bearing 30, with the ball portion 34 contained in the ball cavity, into the open bore of the housing 22.

Obviously, many modifications and variations of the present invention are possible in light of the above teachings. It is, therefore, to be understood that within the scope of the appended claims, the invention may be practiced otherwise than specifically described. Additionally, it is to be understood that all features of all claims and all embodiments can be combined with each other, as long as they do not contradict each other.

What is claimed is:

1. A ball socket assembly, comprising:
a housing with an inner bore;
a bearing received in said inner bore of said housing, said bearing being made as a monolithic piece of a plastic material, and said bearing having a curved bearing surface which surrounds a ball cavity;
an end of the housing being plastically deformed such that the bearing is captured in the inner bore;
a ball stud having a ball portion and a shank portion, said ball portion being received in said ball cavity of said bearing, and said ball portion having an equator;
said curved bearing surface of said bearing being in slidable contact with said ball portion of said ball stud on opposite axial sides of said equator;
said bearing including a plurality of fingers which are spaced circumferentially from one another by slots, each of said fingers having an end face that is chamfered from an outer edge to an inner edge in a direction towards said ball cavity;
said bearing having a wall thickness between an outer surface of said bearing and said ball cavity, and said slots extending from an open end of said bearing to a location where said wall thickness is at a maximum; and
said plastic material of said bearing comprising 8-12 mass percent polytetrafluoroethylene, 2-6 mass percent carbon fibers, and acetal to allow said fingers to deflect radially to allow said ball portion of said ball stud to be inserted into said ball cavity and to also have adequate strength to resist failure when subjected to operational loads.

2. The ball socket assembly as set forth in claim 1 wherein said fingers extend across said equator of said ball portion of said ball stud.

3. The ball socket assembly as set forth in claim 1 wherein at least a portion of said ball stud is heat treated.

4. The ball socket assembly as set forth in claim 3 wherein said heat treated portion of said ball stud is in slidable contact with said curved bearing surface of said bearing.

5. The ball socket assembly as set forth in claim 1 wherein said ball stud is made out of 5140 steel.

6. The ball socket assembly as set forth in claim 1 wherein said bearing has a closed bottom opposite of said fingers, said closed bottom being spaced from said ball portion of said ball stud to define a fluid reservoir.

7. A method of making a ball socket assembly, comprising the steps of:
preparing a bearing which is made as a monolithic piece of a plastic material that comprises 8-12 mass percent polytetrafluoroethylene, 2-6 mass percent carbon fibers, and the remainder acetal, the bearing including a plurality of fingers which are spaced circumferentially from one another by slots and at least partially surround a ball cavity, each of the fingers having an end face that is chamfered from an outer edge towards an inner edge in a direction towards the ball cavity, the bearing having a wall thickness between an outer surface of the bearing and the ball cavity, and the slots extending from an open end of the bearing to a location where the wall thickness is at a maximum;
urging a ball portion of a ball stud towards the ball cavity;
deflecting the fingers in a radially outward direction to allow the ball portion of the ball stud to pass the fingers and be received in the ball cavity;
inserting the bearing with the ball portion contained in the ball cavity into an open bore of a housing; and
plastically deforming a portion of the housing to capture the bearing within the open bore of the housing.

8. The method as set forth in claim 7 after the ball portion of the ball stud is received in the ball cavity of the bearing, the fingers extend across an equator of the ball stud.

9. The method as set forth in claim 7 further including the step of heat treating a portion of the ball stud prior to inserting the ball portion of the ball stud into the ball cavity of the bearing.

10. The method as set forth in claim 9 wherein the ball stud is made of 5140 steel.

11. The method as set forth in claim 7, wherein the bearing has a closed bottom opposite of the fingers, and the closed bottom is spaced from the ball portion of the ball stud to define a fluid reservoir.

12. The method as set forth in claim 7, wherein the step of plastically deforming the portion of the housing includes swaging one end of the housing.

13. A ball socket assembly, comprising:
a housing with an inner bore;
a bearing received in said inner bore of said housing, said bearing being made as a monolithic piece of a plastic material, and said bearing having a curved bearing surface which surrounds a ball cavity;
a ball stud having a ball and shank portion, said ball portion being received in said ball cavity of said bearing, and said ball portion having an equator;
said curved bearing surface of said bearing being in slidable contact with said ball portion of said ball stud on opposite axial sides of said equator;
said bearing having a wall thickness between an outer surface of said bearing and said ball cavity, and said slots extending from an open end of said bearing to a location where said wall thickness is at a maximum;
said bearing having an angled outer wall section that has a frustoconical shape and tapers radially inwardly in a direction away from said open end of said bearing, and said angled outer wall section of said bearing being in surface-to-surface contact with an angled inner wall section of said housing; and
said plastic material of said bearing comprising 8-12 mass percent polytetrafluoroethylene, 2-6 mass percent carbon fibers, and acetal to allow said fingers to deflect radially to allow said ball portion of said ball stud to be inserted into said ball cavity and to also have adequate strength to resist failure when subjected to operational loads.

14. The ball socket assembly as set forth in claim 13 wherein said fingers extend across said equator of said ball portion of said ball stud.

15. The ball socket assembly as set forth in claim 13 wherein at least a portion of said ball stud is heat treated.

16. The ball socket assembly as set forth in claim 15 wherein said heat treated portion of said ball stud is in slidable contact with said curved bearing surface of said bearing.

17. The ball socket assembly as set forth in claim 13 wherein said ball stud is made out of 5140 steel.

* * * * *